April 8, 1952     J. A. SIEFKER ET AL     2,592,348
PROCESS OF PRODUCING ANIMAL FEEDS
Filed March 20, 1950
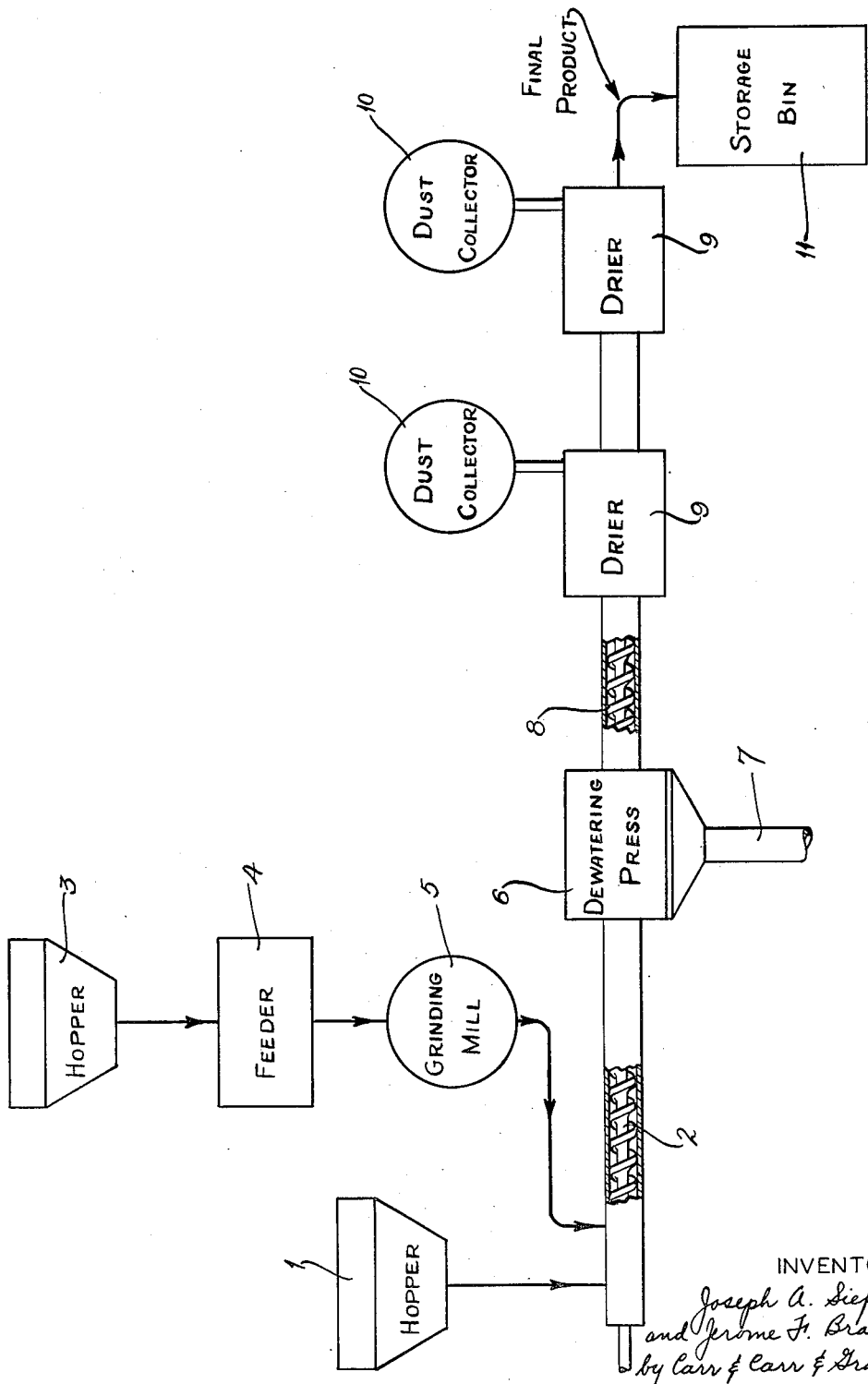
INVENTORS:
Joseph A. Siefker
and Jerome F. Brasch,
by Carr & Carr & Gravely,
THEIR ATTORNEYS.

Patented Apr. 8, 1952

2,592,348

UNITED STATES PATENT OFFICE 2,592,348

PROCESS OF PRODUCING ANIMAL FEEDS

Joseph A. Siefker, St. Louis, and Jerome F. Brasch, Clayton, Mo., assignors to Anheuser-Busch, Inc., St. Louis, Mo., a corporation of Missouri Application March 20, 1950, Serial No. 150,714

4 Claims. (Cl. 99—2)

This invention relates to a process for producing animal or stock feeds of a uniform, intimate, and non-separating mixture of spent hops (i e., hops that have been used in a brewing process) with a stock feed. This invention is an improvement over processes heretofore disclosed for the utilization of spent hops.

The principal object of the present invention is to provide a process which utilizes a by-product that has generally been classified as a waste material to the end that it may become a valuable article of commerce.

Another object of the present invention is to extend the usual stock feeds by adding a small amount of spent hops thereto without producing an ill effect on the palatability of the feed and without lessening the nutritive value thereof.

Still another object of this invention is to provide a process for intimately mixing the hops with the stock feed in such a manner that the hops have no tendency to separate from the stock feed, thereby producing a uniform, intimate, and non-separating mixture.

A further object is to provide a process for producing a stock feed made from a mixture of moist materials which requires essentially only one conveying and drying system.

This invention comprises a process for producing a stock feed comprising grinding moist spent hops, mixing said moist spent hops with a stock feed, pressing said mixture, and then drying said mixture.

The invention further consists in the process hereinafter described and claimed. In the drawings, The figure is a diagrammatic view showing the steps of this new process.

The essential steps of the present process are as follows. Spent hops, which are still in a saturated condition, are mixed with moist stock feeds, such as brewers' spent grains, distillers' spent grains and gluten feed. This is accomplished by having a hopper 1 for the moist stock feed to ensure a steady flow or supply thereof to a screw conveyor 2. A hopper 3 is provided for the moist spent hops to supply a feeder 4 which feeds the hops to any suitable grinding mill such as a hammer mill 5 which grinds the moist spent hops to a certain particle size hereinafter described and directs them into the screw conveyor 2 carrying the moist stock feed. The purpose of the hammer mill 5 is to reduce the particle size of the moist spent hops and make the apparent density of the spent hops when in a dry state substantially the same as the apparent density of the stock feed in a dry state. It has been found that when the particle size of about 80% of the ground spent hops falls within the range of .006 to .06 square inches in surface area, the moist spent hops have been ground satisfactorily for this process.

The hammer mill 5 is a feed grinder in which the grinding operation is performed by several rows of thin metallic hammers revolving at a high speed, which hammers force the material through a curved perforated plate, said plate being spaced from the ends of the metallic hammers. The particle size of the ground material depends upon the size of the perforations in the plate, i. e. the screen size, the speed of the mill, the number, size, and clearance of the hammers, and the power of the prime mover.

One set of conditions which produces ground spent hops whose apparent density is substantially the same as that of brewers' grains is a hammer mill powered by a 30 H. P., 60 cycle induction motor operating on 220–440 volts at 3475 R. P. M., having 69 flat steel hammers ⅛" x 1¾" x 5¾" arranged in three rows each having three groups of three and two groups of seven. A screen having circular holes of ¾" diameter grinds the wet spent hops to the proper particle size without requiring additional water for grinding. A 1" screen allows some material to pass therethrough unground. A ½" screen grinds the product too fine.

It has been found that under the above conditions, the moist spent hops can be ground satisfactorily without the addition of water.

After the moist spent hops have been ground to the proper particle size they are directed into the screw conveyor 2 containing the moist stock feed at a predetermined percentage of final mixture. The moist ground spent hops and the moist stock feed become partially mixed in the screw conveyor 2. This mixture is then conveyed to a suitable dewatering press 6 which presses or squeezes out some of the water or moisture in the mixture and also causes the mucilaginous particles of moist spent hops to adhere to the stock feed. The press 6 is provided with a sewer 7 for disposing of the water removed from the mixture of moist spent hops and stock feed.

This pressed partial mixture is then further mixed in a conveyor 8 leading to the rotary type driers 9 in which the final intimate mixing is attained. Two stages of rotary driers with dust collectors 10 thereon are shown in the drawings. From the driers 9 the dried mixed material is conveyed to a storage bin 11. Obviously, more or less driers, in series or in parallel, may be required for a particular installation. While rotary type driers have been found suitable for this process, other types may be employed.

Controlled particle size is necessary for continuous operation of this process. If whole hop leaves or large fragments thereof pass through the grinder, the hop leaves will not adhere to the grains of the stock feed because of their large surface area and will be carried away in the air draft passing through the driers, and if present in large amounts will clog the dust collectors.

If the wet spent hop leaves are ground too small, the resultant feed would be dusty. Dusty feeds are undesirable in the trade.

The product obtained by this process is superior to that obtained in previously described processes, in that a more uniform product results and in that the average particle size of the hops is smaller than the average particle size of the stock feed, but not so small as to become a dust or powder. Furthermore, the spent hops in the final product cannot be distinguished from the stock feed. The process described is a simplification over previous processes, in that no separate blending and drying is required and the spent hops are not handled separately except in the grinding operation.

The resultant product of this process is essentially nutritionally equivalent to stock feed without the hops if about 6% hops, or less, are used.

What we claim is:

1. A process comprising grinding moist spent hops and mixing said hops with a stock feed, said grinding reducing the particle size of said hops so that after drying the average particle of said hops has a ratio of weight to surface area substantially the same as the ratio of weight to surface area for the average particle of said stock feed, pressing said mixture to reduce the water content, and then drying said mixture.

2. A process comprising grinding moist spent hops and mixing said hops with a moist stock feed, said grinding reducing the particle size of said hops so that after drying the average particle of said hops has a ratio of weight to surface area substantially the same as the ratio of weight to surface area for the average particle of said stock feed, pressing said mixture to reduce the water content, and then drying said mixture.

3. A process comprising grinding moist spent hops and mixing said hops with moist brewers' grains, said grinding reducing the particle size of said hops so that after drying the average particle of said hops has a ratio of weight to surface area substantially the same as the ratio of weight to surface area for the average particle of brewers' grains, pressing said mixture to reduce the water content, and then drying said mixture.

4. A process comprising grinding moist spent hops and mixing said hops with moist brewers' grains, said grinding reducing the particle size of said hops so that after drying the average particle of said hops has a ratio of weight to surface area substantially the same as the ratio of weight to surface area for the average particle of brewers' grains, said grinding being performed in a hammer mill having several rows of their metallic hammers revolving at high speed and a curved perforated plate, said plate being in spaced relation from the ends of the metallic hammers, pressing said mixture to reduce the water content, and then drying said mixture.

JOSEPH A. SIEFKER.
JEROME F. BRASCH.

REFERENCES CITED

The following references are of record in the file of this patent:

UNITED STATES PATENTS

| Number | Name | Date |
| --- | --- | --- |
| 1,036,925 | Stehlin | Aug. 27, 1912 |
| 1,037,357 | Stehlin | Sept. 3, 1912 |